June 26, 1928.  
C. W. DAKE  
DISTRIBUTION VALVE  
Filed June 6, 1927
1,675,306
2 Sheets-Sheet 1
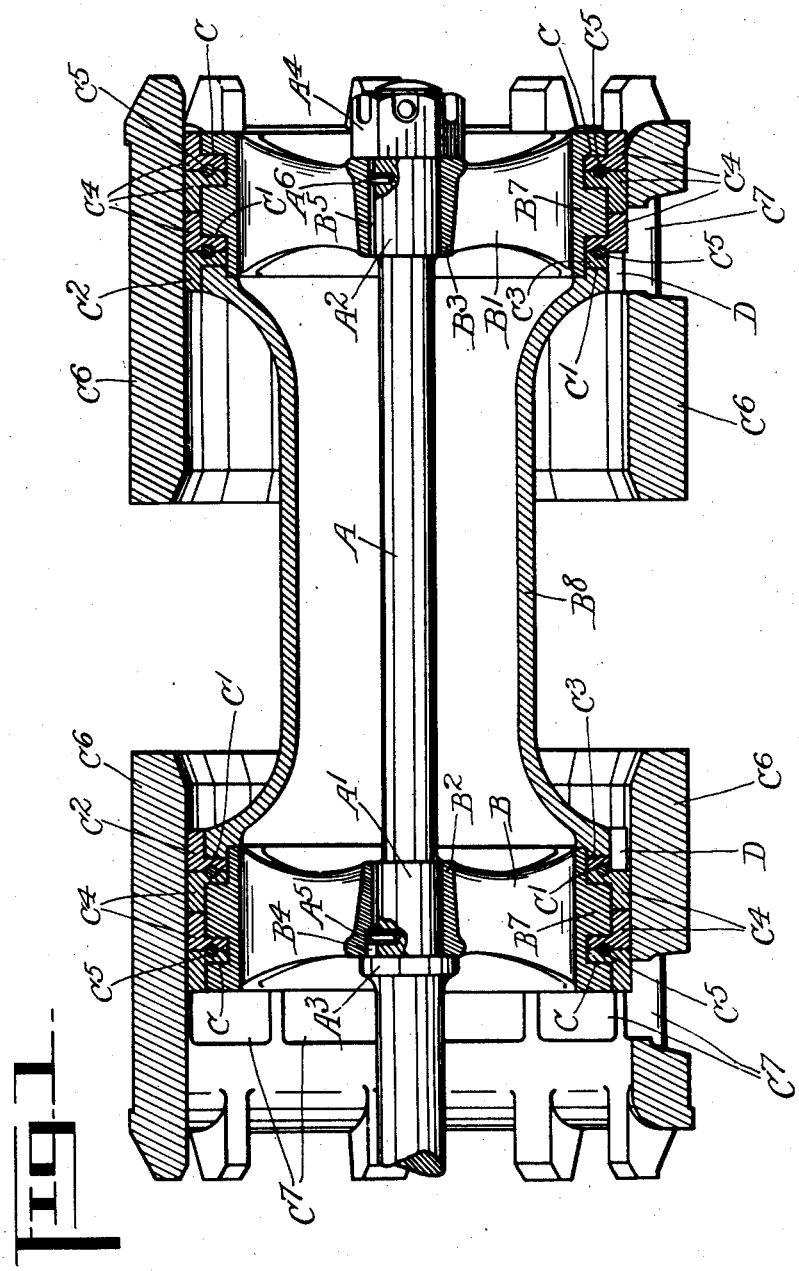
INVENTOR  
Charles W. Dake  
BY  
ATTORNEYS.

June 26, 1928.
C. W. DAKE
1,675,306
DISTRIBUTION VALVE
Filed June 6, 1927
2 Sheets-Sheet 2
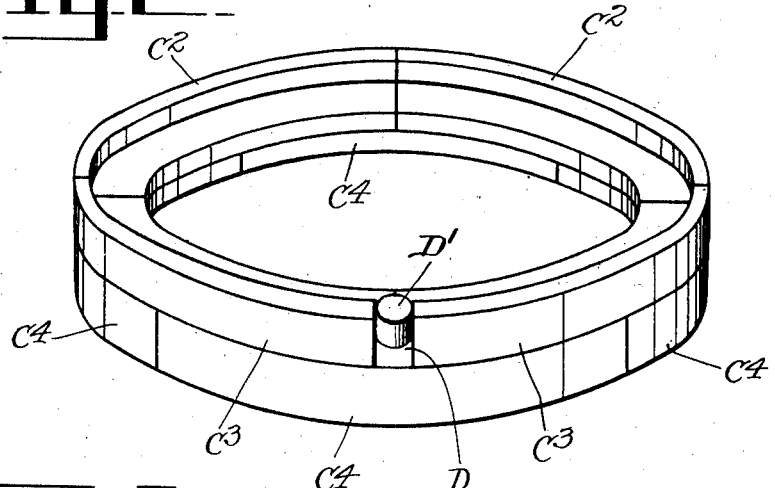
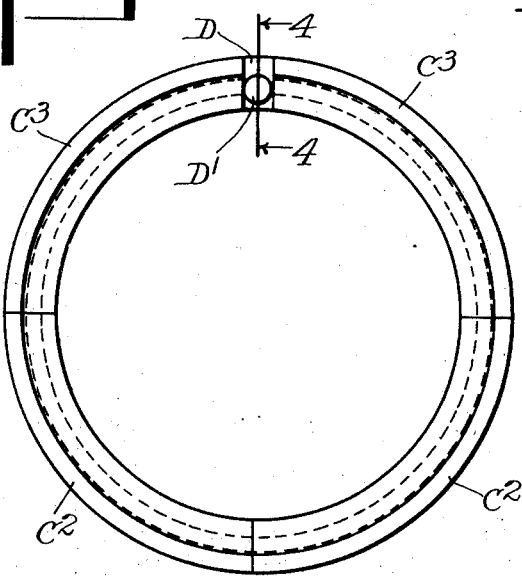
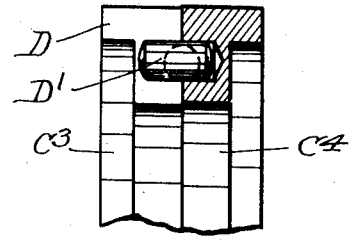
INVENTOR
Charles W. Dake
BY
Parker Carter
ATTORNEYS Patented June 26, 1928.

1,675,306

UNITED STATES PATENT OFFICE.

CHARLES W. DAKE, OF CHICAGO, ILLINOIS, ASSIGNOR TO THE PYLE-NATIONAL COMPANY, OF CHICAGO, ILLINOIS, A CORPORATION OF NEW JERSEY.

DISTRIBUTION VALVE.

Application filed June 6, 1927. Serial No. 196,695.

My invention relates to improvements in distribution valves for steam engines and the like and has particular reference to what is called a duplex valve, that is, a valve wherein the time at which the major part of the working supply of steam is fed into the cylinder, is different from the time when a certain smaller part of the working supply is fed and wherein a moving valve element in cooperation with the valve port accomplishes this double time control.

I provide in connection with the moving valve element an auxiliary port or passage extending behind the cut off edge of the valve. This small port or passage closes after the partial closure of the port and allows steam to enter the cylinder after the main valve part has partially closed the port. This gives in general the same effect as a change in the valve control, and makes it possible to start heavier loads and to carry heavier loads at low speeds than is otherwise the case and becomes altogether inoperative when the speeds are high because the little auxiliary port or passage is so small that at high speeds it exerts a negligible and indistinguishable effect. This makes it possible to get the most satisfactory engine operating conditions without the necessity of long valve travel or complicated valve gearing. The advantage of eliminating complicated valve gearing is obvious, the advantage of eliminating long valve travel is that lubrication difficulties become very serious when the high valve piston speeds required to permit long valve travel are used.

My invention is illustrated more or less diagrammatically in the accompanying drawings, wherein—

Figure 1 is a longitudinal section through a steam engine piston valve and seat embodying my invention;

Figure 2 is a perspective view of one of the piston rings;

Figure 3 is a plan of the ring;

Figure 4 is a section along the line 4—4 of Figure 3.

Like parts are indicated by like characters throughout.

A is a valve stem. At two separated points thereon, it carries enlarged integral pads $A^1$ $A^2$. Bounding that end of the pad $A^1$ furthest removed from the end of the valve stem is a flange $A^3$. $A^4$ is a nut threaded on the end of the valve stem bounding the opposite end of the pad $A^2$. $A^5$ $A^6$ are pins projecting radially beyond the surface of the pads $A^1$ $A^2$.

B $B^1$ are spiders having hubs $B^2$ $B^3$ engaging the pads $A^1$ $A^2$, there being keyways $B^4$ $B^5$ in the hubs to accommodate the pins $A^5$ $A^6$. Each of these spiders has an annular rim $B^7$. $B^8$ is a valve spool adapted to be mounted on the two rims $B^7$, the nut $A^4$ being adapted to exert longitudinal pressure on the valve assembly to force the spider $B^1$ longitudinally to the left compressing the spool $B^8$ against the spider B and compressing the hub $B^2$ of the spider B against the flange $A^3$. Thus the valve assembly is held in a compact unit on the valve stem and the two spiders are held against rotation with respect to the stem.

The rims $B^7$ each have an annular recess C in their outer peripheries and an annular recess $C^1$ is formed between a part of the rim $B^7$ and the shoulder or end of the spool $B^8$ so that in effect the valve assembly has at each end two annular recesses. In these annular recesses are angle cross section valve rings built up of a plurality of segments $C^2$ $C^2$ $C^3$ $C^3$ $C^4$. $C^5$ is a spring ring enclosed between the perpendicular flanges of the rings $C^2$ $C^2$ $C^3$ $C^3$ $C^4$. This spring ring tends to expand these segments against the valve seat $C^6$ with its ports $C^7$. It will be noted that the rings are arranged in groups so that the joints between adjacent segments are staggered to make a steam tight closure between the valve and the seat.

It will further be noted that the segments $C^3$ $C^3$ are cut short so as to provide a gap D and in Figures 3 and 4, this gap is shown to be held open by a pin $D^1$ which projects forward from the adjacent segment $C^4$ into the space between the adjacent segments $C^3$ $C^3$ so as to hold them in place. This gap furnishes an auxiliary port for the valve. It makes no difference how this gap or port is formed, it being only required that there be a port or gap extending back into the ring so as to provide an auxiliary port which closes after the main closing of the valve. It will be noted for instance on the right hand side of Figure 1 that if the valve ring were carried all the way around, the port would be closed but in view of the presence of the auxiliary port D a limited amount of steam may pass through the valve.

As the valve moves back and forth steam will be able to pass through this auxiliary port at times when the main opening is closed but only a small amount of steam will be able to pass and a small additional quantity of steam will be allowed to enter the cylinder when it is especially needed at low speeds.

Obviously if the speeds are great, the time during which any steam will pass through the auxiliary passage is so slight that the amount of steam which can pass in will be so slight in proportion to the amount of steam normally passing that the effect of this auxiliary passage will be greatly minimized and to all practical purposes eliminated, but at low speeds when valve movement is relatively slow the effect of this advance opening and retarded final closing of the steam supply will be to give a longer time during which steam is fed to the working end of the cylinder, thus enabling the engine to carry heavier loads at lower speeds.

I claim:

1. A steam engine distribution valve comprising a ported valve seat, a valve piston reciprocating thereon, a plurality of ring segments carried by the piston engaging the seat, and an auxiliary steam passage extending between the opposed ends of two of said segments to permit passage of steam during the time that the valve is normally closed, means for holding the segments in fixed position in the valve piston and for maintaining the width of the passage between the two ends thereof constant.

2. A steam engine distribution valve comprising a ported valve seat, a valve piston reciprocating thereon, a plurality of segmental packing rings carried by the piston engaging the seat, and an auxiliary steam passage extending between the opposed ends of two of said segments to permit passage of steam during the time that the valve is normally closed, means carried by adjacent segments and penetrating between the segments through which the port is disposed for holding the segments apart to maintain the port open.

Signed at Chicago county of Cook and State of Illinois, this 31st day of May 1927.

CHARLES W. DAKE.